United States Patent
Mickle et al.

(10) Patent No.: US 7,283,053 B2
(45) Date of Patent: Oct. 16, 2007

(54) RFID RADIO FREQUENCY IDENTIFICATION OR PROPERTY MONITORING METHOD AND ASSOCIATED APPARATUS

(75) Inventors: Marlin H. Mickle, Pittsburgh, PA (US); Christopher C. Capelli, Pittsburgh, PA (US); Harold Swift, Gibsonia, PA (US); Charles E. Greene, Pittsburgh, PA (US)

(73) Assignee: University of Pittsburgh - Of the Commonwealth System of Higher Education, Pittsburgh, PA (US)

( * ) Notice: Subject to any disclaimer, the term of this patent is extended or adjusted under 35 U.S.C. 154(b) by 0 days.

(21) Appl. No.: 10/731,789

(22) Filed: Dec. 9, 2003

(65) Prior Publication Data
US 2004/0189473 A1   Sep. 30, 2004

Related U.S. Application Data

(60) Provisional application No. 60/442,838, filed on Jan. 27, 2003.

(51) Int. Cl.
*G08B 13/14* (2006.01)

(52) U.S. Cl. .............. 340/572.2; 340/568.1; 340/10.1; 340/572.8; 342/173; 342/463

(58) Field of Classification Search ......... 340/572.2, 340/572.1, 568.1, 572.7, 10.1, 572.4, 572.5, 340/572.8, 10.4, 10.42, 541, 551; 342/173, 342/450, 463, 42, 51
See application file for complete search history.

(56) References Cited

U.S. PATENT DOCUMENTS

| | | | | |
|---|---|---|---|---|
| 3,798,642 A | * | 3/1974 | Augenblick et al. | 342/42 |
| 4,274,089 A | * | 6/1981 | Giles | 340/572.2 |
| 4,391,149 A | * | 7/1983 | Herzl | 73/861.25 |
| 4,471,344 A | * | 9/1984 | Williams | 340/572.2 |
| 4,700,179 A | * | 10/1987 | Fancher | 340/572.2 |
| 5,204,681 A | * | 4/1993 | Greene | 342/51 |
| 5,381,137 A | | 1/1995 | Ghaem et al. | |
| 5,471,198 A | * | 11/1995 | Newham | 340/573.4 |
| 5,731,762 A | * | 3/1998 | Gila et al. | 340/10.42 |
| 5,809,142 A | * | 9/1998 | Hurta et al. | 705/68 |
| 5,883,575 A | * | 3/1999 | Ruby et al. | 340/572.5 |
| 6,060,815 A | * | 5/2000 | Nysen | 310/318 |
| 6,289,237 B1 | | 9/2001 | Mickle et al. | |
| 6,291,568 B1 | | 9/2001 | Lussey | |
| 6,927,692 B1 | * | 8/2005 | Petrinovic | 340/572.1 |

\* cited by examiner

*Primary Examiner*—Benjamin C. Lee
*Assistant Examiner*—Daniel Previl
(74) *Attorney, Agent, or Firm*—Philip E. Levy; Eckert Seamans Cherin & Mellott, LLC

(57) ABSTRACT

A method of identifying an article of interest includes providing one of a plurality of RF antennas each having a non-linear element which may be a rectifying diode and being resident at a different frequency on the article of interest. One RF antenna is interrogated with RF energy of a first frequency and converts the interrogated RF energy into a reflected energy of a different frequency. The reflected energy is sensed and on the basis of the different frequency determining if a specific antenna is present. The non-linear element may be a diode and is preferably a variable non-linear element. In another embodiment, the reflected RF energy is responsive to a change in ambient physical conditions such as pressure or temperature. Corresponding apparatus is provided.

41 Claims, 4 Drawing Sheets

RFID RADIO FREQUENCY IDENTIFICATION OR PROPERTY MONITORING METHOD AND ASSOCIATED APPARATUS

CROSS-REFERENCE TO RELATED APPLICATION

This application claims the benefit of U.S. Provisional Application Ser. No. 60/442,838, entitled "RFID RADIO FREQUENCY IDENTIFICATION OR PROPERTY MONITORING METHOD AND ASSOCIATED APPARATUS" filed Jan. 27, 2003.

BACKGROUND OF THE INVENTION

1. Field of the Invention

The present invention relates to a method of employing RF energy and a cooperating antenna—non-linear device combination to alter an interrogating frequency in a specific manner so as to provide a specific indication if a particular article of interest is present. In another embodiment the invention provides such a method wherein a physical condition, such as temperature or pressure, will cause responsive alternation of the reflected RF energy and thereby permit a determination of such properties. The invention also relates to corresponding apparatus.

2. Description of the Prior Art

It has long been known to provide non-contacting means for identification or informational purposes. For example, bar codes and cooperating readers have been employed in connection with product identification, price determination, inventory control, identification of individuals or articles, and numerous other purposes.

It has been known to provide radio frequency identification bar code systems which require the use of complimentary metal oxides semiconductor (CMOS) chips for operation.

U.S. Pat. No. 3,798,642 discloses a recognition system for identifying one or more groups of harmonic generating targets which system can be used for personnel or object identification. The system involves transmitting an amplitude modulated signal to a target which responsively generates a harmonic signal having a plurality of signal components of respective amplitudes and means for varying the amplitude of at least one of the signal components with receiver means sensing whether a pre-selected coded arrangement of amplitudes was present.

U.S. Pat. No. 5,381,137 discloses an RF tagging system which has a plurality of resident circuits on a tag with the system determining a resonant frequency of each resonant circuit and producing a corresponding code. It is said to be useful for coding articles such as baggage or production inventory. The radiated signals are said to preferably be phase shifted during the detection process.

It has been known to provide a polymer composition having an electrically conductive filler such that application of forces thereto results in a change in electrical resistance of the material. See U.S. Pat. No. 6,291,568.

It has been known to provide systems wherein RF energy may be transmitted from a base station to a remote station with retransmission from said remote station to said base station being provided to present information to the base station. See U.S. Pat. No. 6,289,237.

In spite of the foregoing known systems, there remains a very real and substantial need for a simple, reliable person or article identification method and related apparatus which avoids the need for use of remote CMOS chips and bar codes. There also remains a need for monitoring methods and apparatus for use in remotely monitoring physical conditions such as pressure or temperature, for example.

SUMMARY OF THE INVENTION

The present invention has met the above described needs.

In a preferred method of the present invention, an article of interest is provided with one of a plurality of RF antennas each having a non-linear device which may be a rectifying diode, each resonant at a different frequency. The article is interrogated with RF energy of a first frequency which is converted to a different frequency and is sensed in order to determine if a specific antenna is present. In one preferred embodiment the RF energy which is used in interrogation is reflected at a frequency which is double the fundamental Fourier frequency. Binary determinations may be employed. Also multiple antennas may be employed.

The method of the present invention may also be employed in monitoring ambient physical conditions such as pressure and temperature.

Corresponding apparatus for performing the methods of the present invention are also provided.

It is an object to the present invention to provide a reliable, automated means for a method and apparatus for determining if a specific article of interest is present.

It is a further object of the present invention to provide such a system which does not require the use of bar codes or semiconductor chips on the article of interest.

It is a further object of the present invention to facilitate such identification in a rapid manner so as to facilitate employing the same in industrial product environments.

It is another object of the present invention to provide such a system which permits the use of multiple interrogation RF frequencies.

It is yet another object of the present invention to provide a binary indication as to each of a plurality of antennas present on an article of interest.

These and other objects of the invention will be more fully understood on reference to the drawings appended hereto.

DESCRIPTION OF THE PREFERRED EMBODIMENTS

As employed herein the term "non-linear element" means a non-linear electrical device which is structured to cooperate in a shared function antenna or more than one antenna to provide an output which varies with external conditions.

As employed herein the term "article of interest" means an article to which an antenna assembly of the present invention is secured in order to provide identification information with respect to the article and shall expressly include but not be limited to products, products containers, personal identification cards, and person identification badges.

Figure 1:
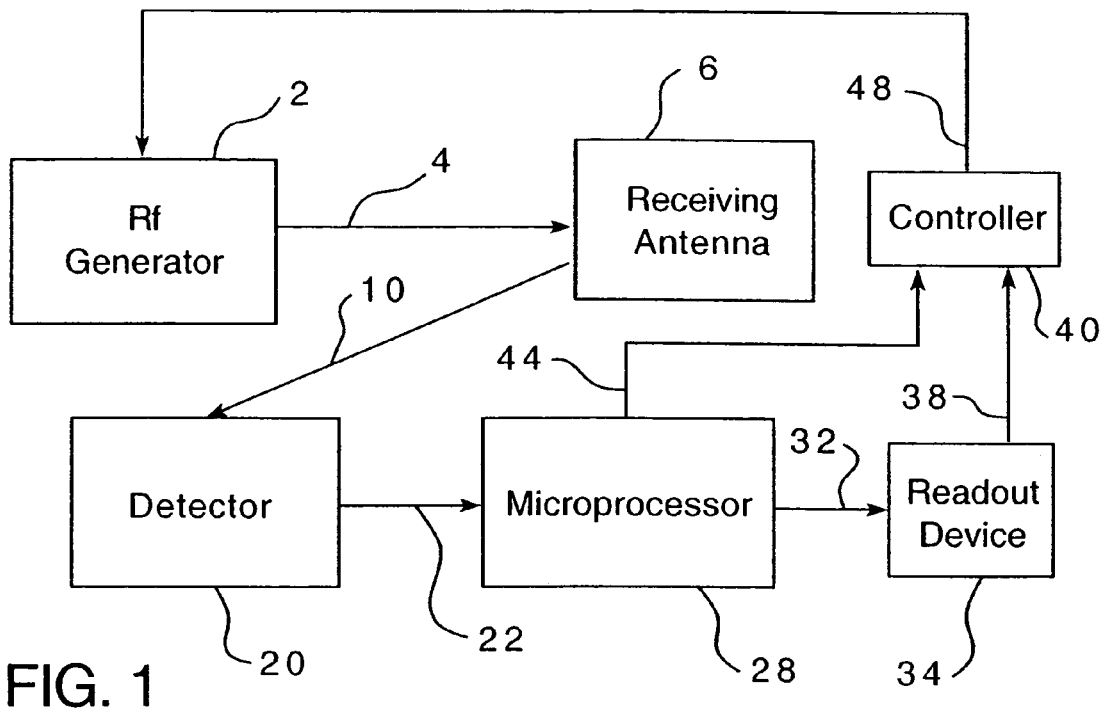
FIG. 1 is a schematic illustration of a form of method and associated apparatus of the present invention.
Figure 2:
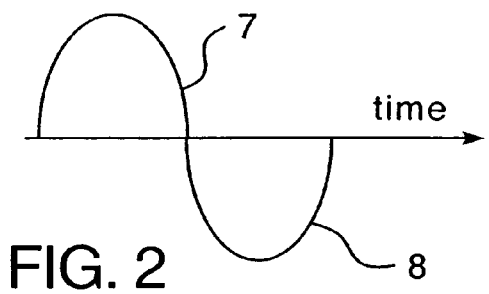
FIG. 2 is a plot of wave amplitude versus time of the interrogating wave as received by the antenna.
Figure 3A:
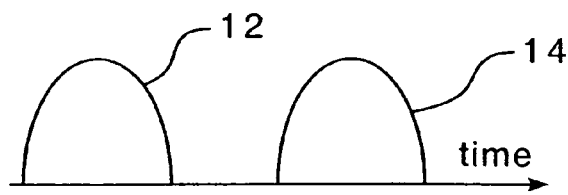
FIGS. 3A and 3B are illustrations of rectified waves as related to time.
Figure 3B:
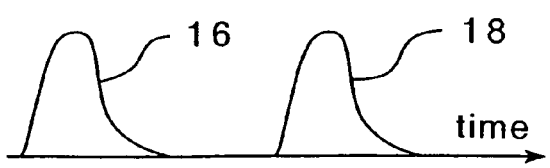

Referring now to FIG. 1 in greater detail, there is shown an RF generator 2 which emits an RF energy beam 4 of a pre-determined frequency. The beam 4 of predetermined RF energy is received by the antenna 6 which is operatively associated with an article of interest as by securing the same to the article or a container for the article. The impinging RF energy as received by the article of interest antenna 6 may be in the form of a sine wave such as is shown in FIG. 2. In FIG. 2 the sine wave of impinging beam 4 consists of segments 7 and 8 with the timeline extending to the right of the figure. The antenna preferably is a single antenna or shared antenna which is operatively associated with a non-linear element such as a diode which results in the reflected RF energy beam 10 being of a different frequency than the interrogating beam 4. In a preferred embodiment, the rectified reflected beam 10 will be as shown in FIGS. 3A and 3B and will have a fundamental Fourier series frequency different from the interrogating frequency of RF energy beam 4. In FIG. 3A the rectified sine wave which represents reflected beam 10 consists of segments 12, 14 with the timeline projecting to the right. In a preferred embodiment, the half wave rectified beam 10, as shown in FIG. 3A, will have a fundamental Fourier series component frequency double that of the applied RF energy beam 4.

FIG. 3A illustrates the response of an ideal diode where the fundamental of the retransmitted frequency is double the received frequency with corresponding harmonics. Variations from the ideal can in turn cause deformation in the resulting signal as in segments 16, 18 of FIG. 3B such that the fundamental frequency is unchanged, but the harmonics and relative harmonic amplitudes will vary depending on the temperature, pressure, humidity and other environmental characteristics.

In this manner, the concept of the invention of employing and interrogating RF band frequency and providing reflected RF beam frequencies which differ substantially from the interrogating frequency enables the determinations to be made.

The reflected RF beam is delivered to detector 20 which in the preferred embodiment senses/deletes the beam 10 and emits responsive output signals 22 to microprocessor 28 wherein a determination is made as to the relationship between the interrogating frequency and the reflected frequency. The microprocessor which provides as output signal 32 to readout device 34 which may provide output by any desired means such as a visual readout, hardcopy, or an output by signal 38 to controller 40. Controller 40 may create a responsive action such as removal of a product from a conveyer if it does not correspond to a desired identity.

Controller 40 also receives a signal from microprocessor 28 and emits signal 48 to initiate a next cycle of RF generator 2 output beam 4 when an article of interest is in the proper position.

Figure 4:
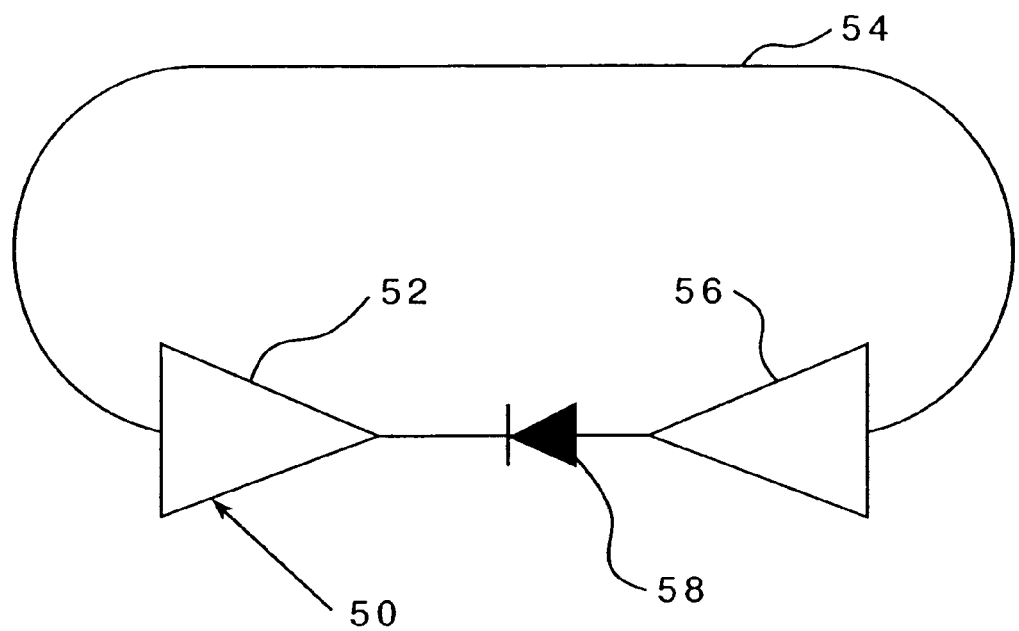
FIG. 4 is an illustration of a diode operatively associated with a receiving/reflecting antenna.

Referring to FIG. 4, there is shown an antenna 50 having a receiving section 52 and a transmitting section 56 with an interposed diode 58 is operatively associated therewith. Physically, the receiving section 52 and the transmitting section 56 may be one and the same antenna element with simultaneous radio frequency activity present. Sections 52 and 56 may be connected physically or functionally though space as by a connecting line 54 disposed between 52 and 56. In this manner, the diode serves to convert the received RF beam 4 as exemplified in FIG. 2 into the reflected RF beam 10 as exemplified by FIG. 3. The assembly of FIG. 4 will be operatively associated with the article of interest either as an attachment to the article itself or on a package for the article or in the case of identification card on the same whether formed integrally thereon or preformed and secured thereto. This will permit the method and apparatus of the present system to determine if the specific frequency desired from a plurality of potential frequencies is in fact associated with the article of interest.

Figure 5A:
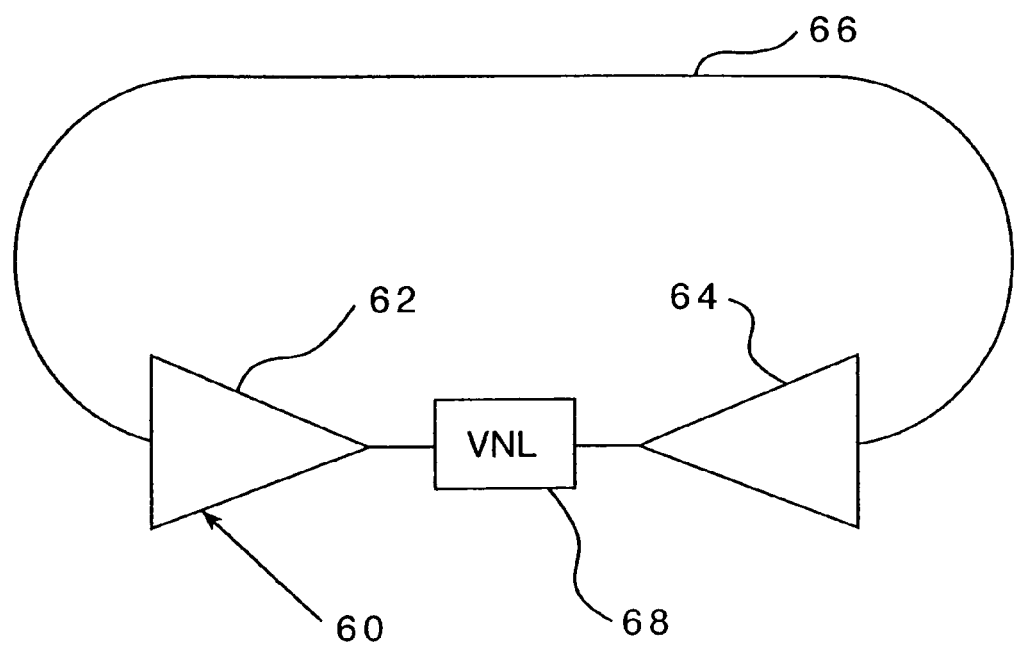
FIG. 5A is an illustration of a variable non-linear element associated with a receiving/reflecting antenna.

Turning to FIG. 5A, an antenna 60 has a receiving segment 62 and a transmitting segment 64. The antenna 60 in this embodiment has a variable non-linear device (VNL) 68 which as defined in hereinbefore may be employed. Physically, the receiving section 62 and the transmitting section 64 may be one and the same antenna element with simultaneous radio frequency activity present. Thus sections 62 and 64 may be connected physically or functionally through space by a connecting line 66 disposed between 62 and 64. Such a device may, for example, be a diode, or other nonlinear element whose response depends on the temperature, pressure, pH, humidity, pH chemical environment, biological environment, radiation light, chemical concentrations, or other physical conditions to cause variation in frequency.

In this embodiment of the invention, the method and apparatus serve to monitor certain physical conditions remotely, such as temperature, pressure, humidity, chemical environment, light, pH, biological toxins, radiation, or mid stress-strain, for example.

Figure 5B:
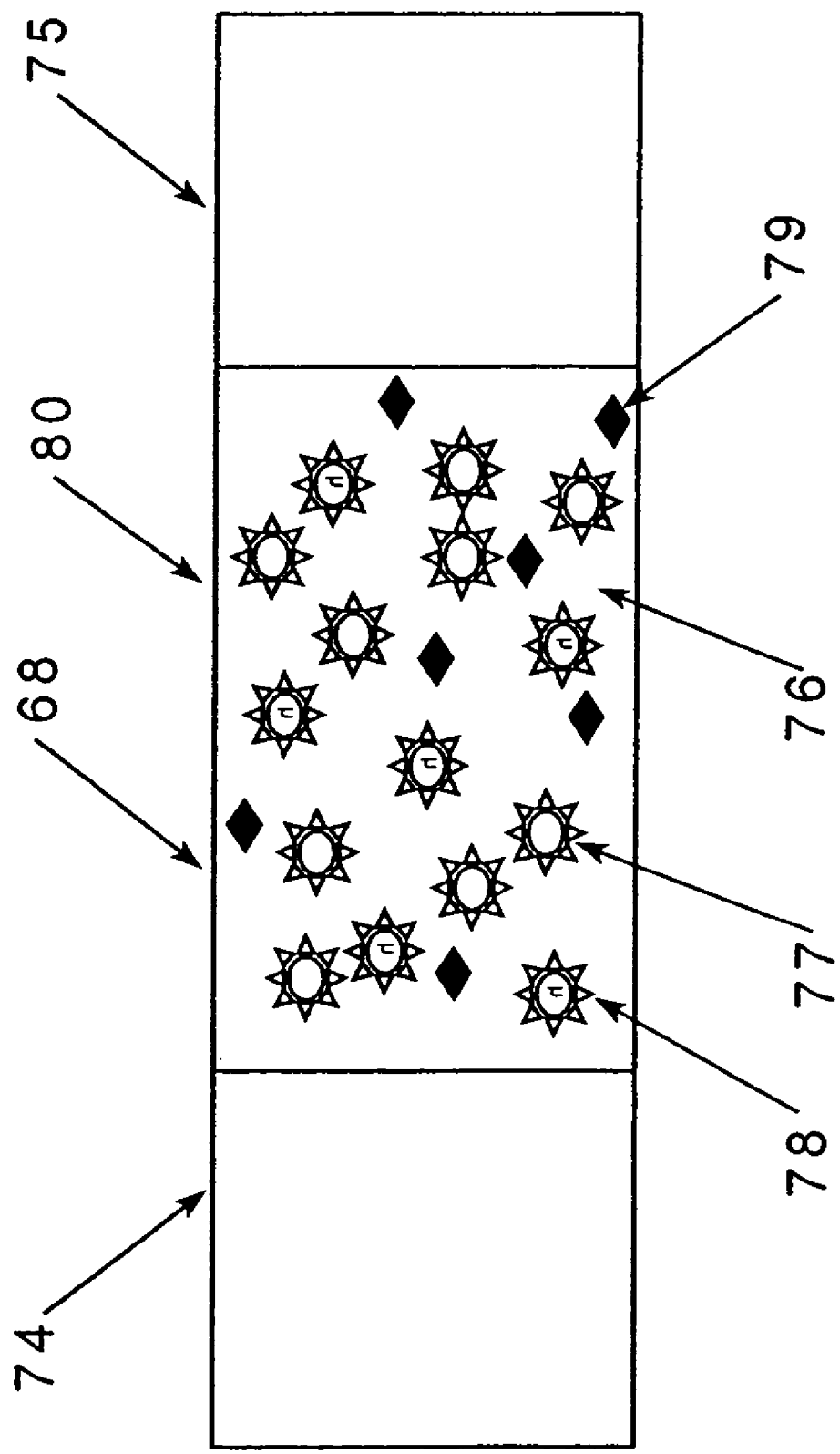
FIG. 5B is a detailed illustration of a variable non-linear element.

FIG. 5B provides a more detailed schematic of the non-linear device 68. A preferred non-linear device 68 of this invention is a metal-insulator-metal (MIM) diode. One version of the MIM diode is disclosed in U.S. Pat. Nos. 6,368,705 and 6,291,096. The MIM diode is made up of two conductive layers 74, 75 separated by metal-insulator layer 80. The two conductive layers 74, 75 may be composed of the same material that makes up the antennas 50, 60 or it can consist of a separate conductive material that connects the antennas 50, 60 to metal-insulator layer 80. The conductive materials can include carbon or gold or other conductive materials such as chromium, tungsten, molybdenum oxides. Additionally, the conductive materials may include polymer compositions such as metal particles dispersed in a polymer binder. The metal-insulator layer 80 in a preferred form consists of semiconductor-like particles 77 suspended in a dielectric binder 76. The semiconductor-like particles 77 can consist of any particle materials that have semiconductor properties (i.e., pn junction properties). Semiconductor-like particles of interest include particles of refractory metal having an oxide layer 78 such as tantalum or niobium. Preferably, the metal particles have an oxide coating 78 that is self-limiting, stable with a suitable dielectric constant. These metal particles 77 are suspended in a dielectric binder 76.

The polymer binder 76 may be any material that exhibits good dielectric properties. For antenna sensors that vary with external conditions the preferred polymer binder is an elastomer conductive polymer composition. This conductive polymer composition displays a large dynamic resistance range and isotropic electrical properties when subjected to distortion forces such as compression or extension forces or alignments created by mechanical energy, thermal energy, electric field or magnetic field. An example of binder composition useful for this invention if provided in U.S. Pat. No. 6,291,658. The binder composition is elastically deformable from a quiescent state and comprises at least one electrically conductive filler made up of conductive particles 79 mixed with a non-conductive elastomer binder 76. The binder compositions may include polymer compositions such as silicone or polyurethane elastomers. The binder compositions can also include materials such as epoxies.

The filler particles 79 are preferably mixed in the binder in the volumetric ratio of filler to binder of at least 0.1:1. The filler particles are mixed in the binder in a controller manner whereby the filler is dispersed within and encapsulated by the binder and remains structurally intact.

The preferred filler for this invention are electrically conductive particles including particles of carbon, copper, gold and/or aluminum. Additionally, the conductive particles 77 can be semiconductor-like particles such as piezoelectric ceramic or piezoelectric semiconductor particles. Piezoelectric particles useful for this invention are disclosed in U.S. Pat. Nos. 6,240,786, 4,826,616 and 4,101,454.

Other additives can be added to the binder composition for the purpose of modifying the physical and electrical properties of the uncured or cured polymer compositions, if desired. These additives can include at least one property modifier such as fumed silica, silica and gel, for example.

EXAMPLE 1

A preferred non-linear device of this invention is a metal-insulator-metal (MIM) diode. A MIM diode was produced as follows: First, tantalum oxide was produced by taking 1 g of tantalum powder (<2 micron, Alfa Aesar) was mixed with 1 cc water in a ceramic bowl. The mixture was placed in an oven at 150° C. for 20 minutes. The mixture was then remixed and placed back in the oven for an additional 15 minutes. Second, a dielectric binder was produced by dissolving 1.0 g of epoxy (0.5 g part A and 0.5 gm part B, Proxy Epoxy Craft, 2 part epoxy) in 5 ml methyl ethyl ketone (MEK). To the epoxy MEK solution was added 1 g of carbon powder (Glassy carbon spherical powder, 10-20 micron, type 1, Alfa-Aesar). Third, MIM composition was then produced by adding 0.5 g of the tantalum oxide powder to the dielectric binder.

The MIM composition was tested by coating the composition on copper foil to a nominal wet thickness of 5 mil. The composition was dried in an oven set at 150° C. for 5 minutes. The resulting film was of good quality. The coated foil was then tested by attaching two terminals. One terminal is connected to the top part of the film and the other terminal is connected to the copper foil. These terminals were then used to connect the device under test to a curve tracer. This curve tracer gave the current versus voltage characteristics needed to see if the device was in fact a diode. If the MIM device under test has current and voltage relationship comparable to a diode then further testing is done. The diode is then tested for the series resistance. If the resistance is under 500 O then an impedance test over a range of frequencies is administered. Typical frequency values are currently in the range of 20 MHz to 120 MHz. A signal generator is then used to create the frequency of choice and the transmitted signal and the rectified signal are observed on an oscilloscope. The rectified signal is created by passing the generated signal through the MIM diode. This test verifies that the MIM diode has rectification properties, as seen from the measured IV curve. The MIM composition of this example is useful in antenna sensors of the disclosed invention.

Assuming that an antenna is designed for a frequency $f_i$, and will respond by radiating or reflecting upon receipt of RF energy at frequency $f_i$ by radiating or reflecting a frequency $2 f_i$. The range of all possible antennas and frequencies $f_i$ will be such that for i=1, 2, . . . , n, the corresponding antenna will radiate or reflect at $2 f_i$. This provides for a radio frequency identification implementation for a set of n frequencies providing $2^n$ possible combinations. This provides for a large variety of frequencies and also precludes there being for any $f_i$ included in the total array of frequencies F any $f_j$ such that $f_j=2f_j$ or $f_j=2 f_j$ for i or j=1, 2, 3, . . . , n. It is further noted that for the spectrum $f_i$, to $f_i$+delta f represented as $s_i$, the 2 spectra $s_i$, $s_j$ contain no common frequencies for i, j=1, 2, . . . , n and the spectra 2 $s_i$, $s_j$ and $s_i$, 2 $s_j$ contain no common frequencies.

It will be appreciated that in the design of the antennas, it is desired to have a sufficiently high Q, narrow spectrum, and the narrow spectrum provides separation or selectivity in any given area of the spectrum.

Figure 6:
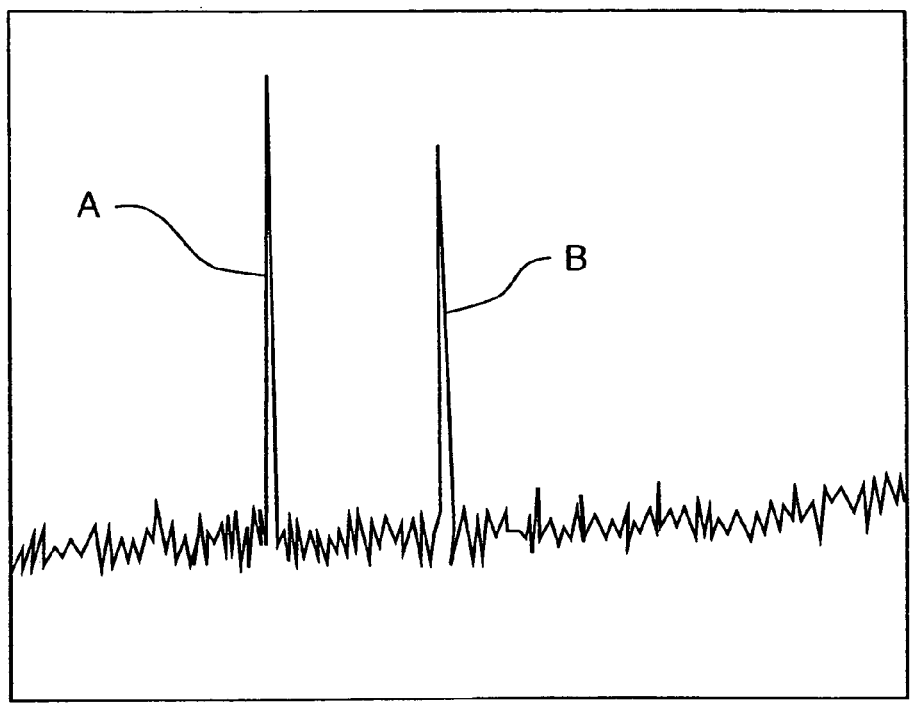
FIG. 6 is a plot of interrogating RF energy pulses at different frequencies with no tags found in the region being interrogated.

Referring to FIG. 6, an example of dipole antenna reflectors will be considered. Assuming that two interrogating frequencies at 915 MHz and 1.5 GHz are imposed on a potential article of interest. Reflected frequencies of either 1.83 GHz and 3.0 GHz, respectively would indicate that a binary "1" in respect to the first digit location would indicate that an antenna of the desired frequency was associated with the article of interest. A binary number "1" in the second digit location would indicate the presence of the desired antenna with respect to the second frequency. A "0" in either category would indicate that no tags having the desired responsive frequency were present.

In FIG. 6, the first spike A indicates the interrogating frequency 9.15 MHz and the second spike B is representative of the frequency 1.5 GHz interrogating frequency. As there are no subsequent spikes related thereto, the output would be "00" indicating that neither frequency had a tag of the desired frequency. If the first interrogating frequency A had had a proper responsive frequency and the second did not, the binary representation to indicate this would be "10." If on the other hand the first interrogating frequency had no responsive related reflected frequency, while the second did, the binary representation would be "01."

Figure 7:
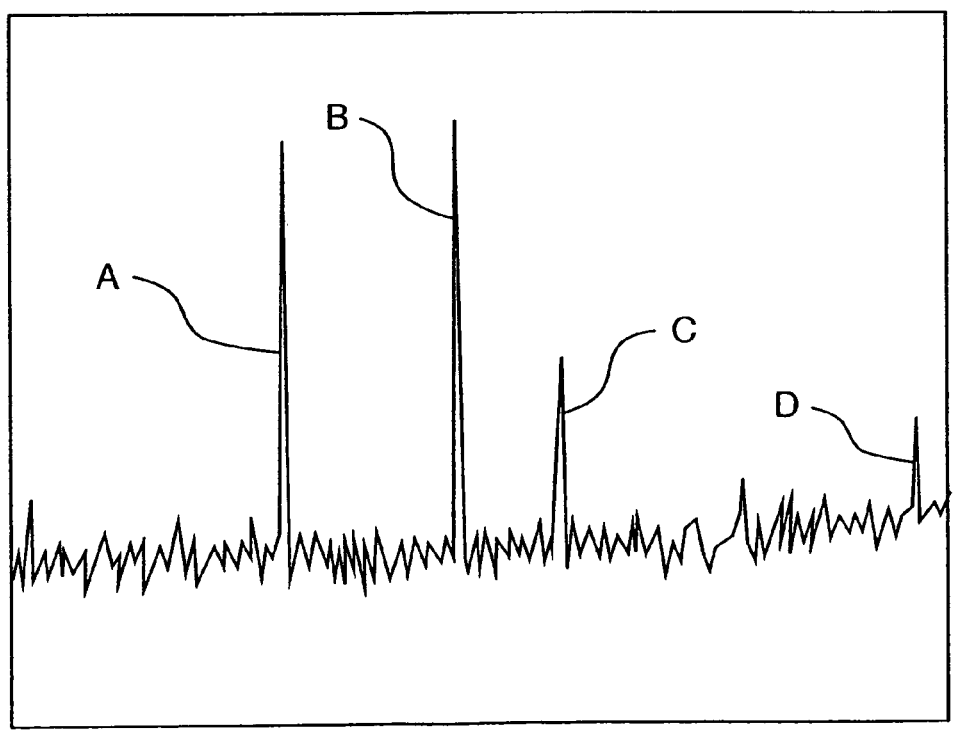
FIG. 7 illustrates a plot of interrogation RF energy pulses of different frequencies and to responsive reflected RF energy pulses of different frequencies confirming the presence of a specifically identifiable article of interest within the zone being interrogated.

Referring to FIG. 7, there is shown the spikes A, B representative of the interrogating frequencies 915 MHz and 1.5 GHz respectively. In this experiment, however, a reflective spike C having a frequency of 1.83 GHz, which is double that of spike A, shows that there was in fact an antenna of the desired specific frequency associated with the article of interest. In the particular example, the antenna was positioned on the interior of a conventional cereal box. Similarly, with respect to the spike D, which had a frequency of 3 GHz, this was indicative of the desired frequency being present as related to spike B. In each instance, the reflected RF beam had a frequency which was double the interrogating frequency. This situation would be represented by the binary expression "11."

While for simplicity of disclosure, the use of a diode or other non-linear element has been shown as being present individually. It will be appreciated that, if desired, the non-linear devices may be used in conjunction with another non-linear element such as a diode to produce other wave forms.

In the embodiment wherein, physical conditions are monitored, this may merely be accomplished by altering electrical characteristics of the non-linear elements such as, for example, resistivity.

EXAMPLE 2

One or more of the antennas may have a variable non-linear element VNL such that at one environmental condition the reflected frequency is 2f with transmitted frequency f. For example, 2f could indicate 68° Fahrenheit as a temperature. For a given increment of temperatures, 68°±?, the reflected frequency may be 2f±k ? f, where k is a scaling constant. If the maximum range of variation of reflected frequency, 2f±k ? f, does not overlap another potential reflected frequency, the given antenna and VNL element indicate both presence of the antenna, a true or "1" condition, but also a sensor measurement of one environmental condition. Each antenna/VNL combination thus provides both an existence condition and a sensor measurement.

The active antenna sensors of this invention may be employed advantageously in the remote detection of external conditions. The active antenna sensors could be used in conjunction with a remote transponder. This transponder would transmit RF at a specific frequency and have the ability to receive RF from the active antenna sensors over a range of frequencies. The active antenna sensors could be used alone to provide a low cost way to measure external conditions remotely. For example, the antenna sensors of this invention could be used to assist reaction conditions in a solution undergoing a chemical reaction (e.g., measuring temperature, pH, disappearance of chemical reagents). The antenna sensors could be made exceedingly small so as to be incorporated into different structural compositions (i.e., paint, composite fibers, cement, and rubber, for example) to ascertain the conditions of the structural composition. One end use example, as disclosed in U.S. Pat. No. 6,240,786, would be the inclusion of active antenna sensors into composite structural material to detect cracks.

It will be appreciated therefore that the present invention provides a method and related apparatus for making effective use of multiple antennas which are associated with a diode or other non-linear device such that RF energy interrogating the antenna will be reflected at a pre-determined different frequency such that in rapid automated fashion, the article of interest can be identified, or in other embodiments physical properties may be monitored accurately, rapidly and efficiently.

Where particular embodiments of the invention have been described herein for purposes of illustration, it will be appreciated by those skilled in the art that numerous variations of the details may be made without departing from the invention as described in the appended claims.

We claim:

1. A method of identifying an article of interest, comprising:
    providing one of a plurality of RF antennas each having a non-linear element and being resonant at one of a plurality of different frequencies positioned on an article of interest,
    interrogating said one RF antenna with RF energy of a first frequency,
    converting said interrogating RF energy into reflected RF energy of a different frequency from said first frequency,
    sensing said reflected RF energy,
    determining a difference between said first frequency and said different frequency by subtracting one of said first frequency and said different frequency from the other of said first frequency and said different frequency, and on the basis of said difference between said first frequency and said different frequency determining if a specific said antenna is present.

2. The method of claim 1 including said non-linear element is a rectifying diode.

3. The method of claim 2 including said specific antenna is present and said different frequency being about double said first frequency.

4. The method of claim 1 including said one RF antenna providing a half wave rectified sine wave from said interrogating RF energy.

5. The method of claim 4 including said interrogating RF energy producing a sine wave.

6. The method of claim 4 including said half wave rectified sine wave has a fundamental Fourier series which is about double the frequency of said sine wave.

7. The method of claim 1 including employing two said interrogating frequencies in determining if an article of interest is present.

8. The method of claim 7 including employing a spectrum analyzer in analyzing said different frequency.

9. The method of claim 7 including employing a spectrum analyzer structured to monitor each interrogating frequency in determining if an article of interest is present.

10. The method of claim 1 including employing a binary analysis in determining if an article of interest is present.

11. The method of claim 10 including employing said method to provide specific identification of the antenna if an article of interest is present.

12. The method of claim 1 including a second non-linear element cooperating with said non-linear element to provide a variable readout which is a function of a specific physical condition.

13. The method of claim 12 including employing as said non-linear elements a variable non-linear element.

14. The method of claim 1 including said physical condition being a condition selected from the group consisting of pressure, temperature, pH, chemical concentrations and humidity, chemical environment, biological environment, radiation, and light.

15. Apparatus for determining if an article of interest is present, comprising:
    said article of interest having at least one antenna, one of said at least one antenna being resonant at one frequency of a plurality of available frequencies,
    a non-linear element operatively associated with said one of said at least one antenna,
    an RF frequency generator for directing RF energy of a particular frequency to said one of said at least one antenna, said non-linear element causing said one of said at least one antenna to transmit reflected RF energy in response to receipt of said RF energy, said reflected RF energy having a reflected frequency that is different than said directed particular frequency,
    a detector for receiving said reflected RF energy from said one of said at least one antenna, and
    a processor adapted to determine a difference between said directed particular frequency and said reflected frequency by subtracting one of said directed particular frequency and said reflected frequency from the other of said directed particular frequency and said reflected frequency and to determine from a said difference between said reflected frequency and said directed particular frequency whether the one of said at least one antenna is a specific antenna.

16. The apparatus of claim 15 including said non-linear element being a rectifying diode.

17. The apparatus of claim 16 including said RF frequency generator being structured to provide at least two said interrogating RF frequencies.

18. The apparatus of claim 16 including a spectrum analyzer for analyzing said different frequencies.

19. The apparatus of claim 16 including a second non-linear element cooperating with said non-linear element to provide a variable readout which is a function of a specific physical condition.

20. The apparatus of claim 19 including said physical condition being a condition selected from the group consisting of pressure, temperature, pH, chemical concentrations, humidity, chemical environment, biological environment, radiation, and light.

21. The apparatus of claim 15 including said RF frequency generator being structured to produce interrogating RF energy in the form of a sine wave.

22. The apparatus of claim 21 including said one of said at least one antenna being structured to produce a half wave rectified sine wave from said interrogating RF energy.

23. The apparatus of claim 22 including said one of said at least one antenna being structured to provide said half wave rectified sine wave at a fundamental Fourier series component which is about double the frequency of said sine wave.

24. A method of monitoring an ambient physical property, comprising:
providing an antenna having a non-linear element whose response depends on the physical property being monitored,
interrogating said RF antenna with RF energy of a first frequency,
converting the interrogating RF energy into reflected RF energy of a different frequency from said first frequency, said different frequency being dependent on the physical property being monitored,
sensing said reflected RF energy,
determining a difference between said first frequency and said different frequency by subtracting one of said first frequency and said different frequency from the other of said first frequency and said different frequency, and
on the basis of said difference between said first frequency and said different frequency determining the state of said physical property.

25. The method of claim 24 wherein said non-linear element is a rectifying diode.

26. The method of claim 25 wherein said different frequency being about double said first frequency.

27. The method of claim 24 including said antenna providing a half wave rectified sine wave from said interrogating RF energy.

28. The method of claim 27 including said interrogating RF energy producing a sine wave.

29. The method of claim 27 including said half wave rectified sine wave has a fundamental Fourier series which is about double the frequency of said sine wave.

30. The method of claim 24 including employing a spectrum analyzer in analyzing said different frequency.

31. The method of claim 24 including employing a second non-linear element cooperating with said non-linear element to provide a determination regarding whether an article of interest is present.

32. The method of claim 24 including said ambient physical property being a condition selected from the group consisting of pressure, temperature, pH, chemical concentrations and humidity, chemical environment, biological environment, radiation, and light.

33. Apparatus for monitoring an ambient physical property, comprising:
an antenna being resonant at one frequency of a plurality of available frequencies,
a non-linear element operatively associated with said antenna whose response depends on the physical property being monitored,
an RF frequency generator for directing RF energy at a particular frequency to said antenna, said non-linear element causing said antenna to transmit reflected RF energy in response to receipt of said RF energy, said reflected RF energy having a reflected frequency that is different than said directed particular frequency and that is dependent on the physical property being monitored,
a detector for receiving said reflected RF energy from said antenna, and
a processor adapted to determine a difference between said particular frequency and said reflected frequency by subtracting one of said particular frequency and said reflected frequency from the other of said particular frequency and said reflected frequency and to determine from a said difference between said particular frequency and said reflected frequency the state of the physical property being monitored.

34. The apparatus of claim 33 including said non-linear element being a rectifying diode.

35. The apparatus of claim 34 including said RF frequency generator being structured to provide at least two said interrogating RF frequencies.

36. The apparatus of claim 34 including a spectrum analyzer for analyzing said different frequencies.

37. The apparatus of claim 34 including a second non-linear element cooperating with said non-linear element to provide a variable readout which is a function of said physical property.

38. The apparatus of claim 37 including a second non-linear element cooperating with said non-linear element to provide a variable readout which is a function of said physical property.

39. The apparatus of claim 33 including said RF frequency generator being structured to produce interrogating RF energy in the form of a sine wave.

40. The apparatus of claim 39 including said antenna being structured to produce a half wave rectified sine wave from said interrogating RF energy.

41. The apparatus of claim 40 including said antenna being structured to provide said half wave rectified sine wave at a fundamental Fourier series component which is about double the frequency of said sine wave.

* * * * *